United States Patent
Lim

(10) Patent No.: US 11,960,016 B2
(45) Date of Patent: Apr. 16, 2024

(54) APPARATUS AND METHOD FOR DETECTING LOCATION OF UWB MODULE INSTALLED IN VEHICLE

(71) Applicant: HYUNDAI MOBIS CO., LTD., Seoul (KR)

(72) Inventor: Jong Chul Lim, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 65 days.

(21) Appl. No.: 17/654,769

(22) Filed: Mar. 14, 2022

(65) Prior Publication Data
US 2023/0121155 A1    Apr. 20, 2023

(30) Foreign Application Priority Data
Oct. 15, 2021    (KR) .................. 10-2021-0137529

(51) Int. Cl.
| | |
|---|---|
| *G01S 5/02* | (2010.01) |
| *G01S 5/14* | (2006.01) |
| *G07C 5/08* | (2006.01) |
| *B60R 25/24* | (2013.01) |

(52) U.S. Cl.
CPC .............. *G01S 5/0221* (2013.01); *G01S 5/14* (2013.01); *G07C 5/0808* (2013.01); *B60R 25/24* (2013.01)

(58) Field of Classification Search
CPC .............. G01S 5/0221; G01S 5/14; G01S 7/40
USPC ........................................................ 342/451
See application file for complete search history.

(56) References Cited

U.S. PATENT DOCUMENTS

| | | | |
|---|---|---|---|
| 7,706,432 B2 | 4/2010 | Hashimoto | |
| 2023/0121155 A1* | 4/2023 | Lim ............... | G01S 5/14 342/451 |

FOREIGN PATENT DOCUMENTS

| | | | | |
|---|---|---|---|---|
| CN | 110972063 A | * | 4/2020 | ............. G01S 5/14 |
| CN | 110988829 A | * | 4/2020 | ............. G01D 18/00 |
| CN | 114666895 A | * | 6/2022 | |
| JP | 2020-122725 | | 8/2020 | |
| KR | 10-116085 | | 6/2012 | |
| KR | 10-1745709 | | 6/2017 | |
| KR | 10-2020-0049269 | | 6/2020 | |
| KR | 10-2020-0131526 | | 11/2020 | |
| WO | WO-2020230993 A1 | * | 11/2020 | ......... G01S 13/0209 |

OTHER PUBLICATIONS

Korean Office Action dated Dec. 20, 2023 issued in KR 10-2021-0137529.

* cited by examiner

*Primary Examiner* — Harry K Liu
(74) *Attorney, Agent, or Firm* — DLA Piper LLP (US)

(57) ABSTRACT

A diagnosis command and a display of a diagnosis result using a vehicle diagnosis device upon after-sales inspection or during the inspection (EOL) during vehicle production. Using a diagnostic function of a controller related to a digital key or a fob key (e.g., a body domain controller (BDC), an integrated body control unit (IBU), or an identity authentication unit (IAU)) and using an existing method and equipment (e.g., a vehicle diagnosis device), the position of a UWB module is detected to estimate whether the module is in an abnormal state (installation in an incorrect position, deviation from a correct position, etc.).

19 Claims, 4 Drawing Sheets

APPARATUS AND METHOD FOR DETECTING LOCATION OF UWB MODULE INSTALLED IN VEHICLE

CROSS-REFERENCE TO RELATED APPLICATION

This application claims priority to and the benefit of Korean Patent Application No. 10-2021-0137529, filed on Oct. 15, 2021, the disclosure of which is incorporated herein by reference in its entirety.

BACKGROUND

Field of the Invention

The present invention relates to an ultra-wideband (UWB) module, and more particularly, to a technology for detecting the location of a UWB module installed in a vehicle.

Discussion of Related Art

Ultra-wideband (UWB) communication is a communication scheme that uses a signal with a very short wavelength of 6 to 8 GHz and a bandwidth of 500 MHz or more. This communication scheme is being utilized to calculate the distance between communication entities by multiplying the speed of light by a signal arrival time between the communication entities using Time of Flight (ToF) technology. Unlike Wi-Fi or Bluetooth, this communication scheme can measure a distance in centimeters and also has a very long transmission distance of up to 100 meters. Also, this communication scheme has the advantage of excellent security because distance measurement is allowed only between specific registered devices. UWB communication is a technology used in various fields ranging from smartphones to automobiles in recent years.

For communication with a digital car key, a key fob, and the like, a UWB module is applied to automobiles. If a UWB module is installed greatly out of place due to an error or a mistake of an assembler or in an assembly process during an assembly stage of the UWB module in automobile production, this problem should be found at an end of line (EOL) after vehicle manufacturing. In addition, if the UWB module becomes out of place due to shock or other reasons while driving, a problem may occur in related functions (digital key positioning, fob authentication, etc.). This problem should be solved by a consumer recognizing the problem and visiting an auto repair shop or should be found at a regular vehicle inspection.

SUMMARY OF THE INVENTION

As described above, when an ultra-wideband (UWB) module is installed out of place in a vehicle or moved from its original position due to other shocks, it is not possible to normally provide services because a problem with a function such as digital key positioning, fob authentication, etc. arises if a user uses the vehicle without knowing that UWB module is installed out of place or moved. Accordingly, the present invention detects the above-described problem relatively simply by issuing a diagnosis command and displaying a diagnosis result using a vehicle diagnosis device upon after-sales inspection or during the inspection (EOL) during vehicle production.

In order to solve the above problems, according to the present invention, using a diagnosis function of a controller related to a digital key or a fob (e.g., a body domain controller (BDC), an integrated body control unit (IBU), or an identity authentication unit (IAU)) and using an existing method and equipment (e.g., a vehicle diagnosis device), the position of a UWB module is detected to estimate whether the module is in an abnormal state (installation in an incorrect position, deviation from a correct position, etc.). Accordingly, it is possible to find out the current state of an installation position of a UWB module, which is invisible from the outside of the vehicle, by utilizing the unique function of the UWB module without disassembling a vehicle.

The configuration and action of the present invention will become more apparent through specific embodiments described below with reference to the drawings.

DETAILED DESCRIPTION OF EXEMPLARY EMBODIMENTS

Advantages and features of the present invention and methods of achieving the same will become apparent with reference to preferred embodiments described in detail together with the accompanying drawings. However, the present invention is not limited to the following embodiments and may be implemented in various forms. The embodiments are merely provided to completely disclose the present invention and to fully inform those skilled in the art about the scope of the present invention, and the present invention is defined by the appended claims. Also, terms used herein are only for describing the embodiments while not limiting the present invention. Herein, the singular forms "a," "an," and "one" include the plural unless the context clearly indicates otherwise. Also, the terms "comprises" and/or "comprising" are used to specify the presence of stated elements, steps, operations, and/or components, but do not preclude the presence or addition of one or more other elements, steps, operations, and/or components. Hereinafter, the preferred embodiments of the present invention will be described in detail with reference to the accompanying drawings. At this time, detailed descriptions of well-known elements or functions will be omitted if the descriptions may obscure the gist of the present invention.

Figure 1:
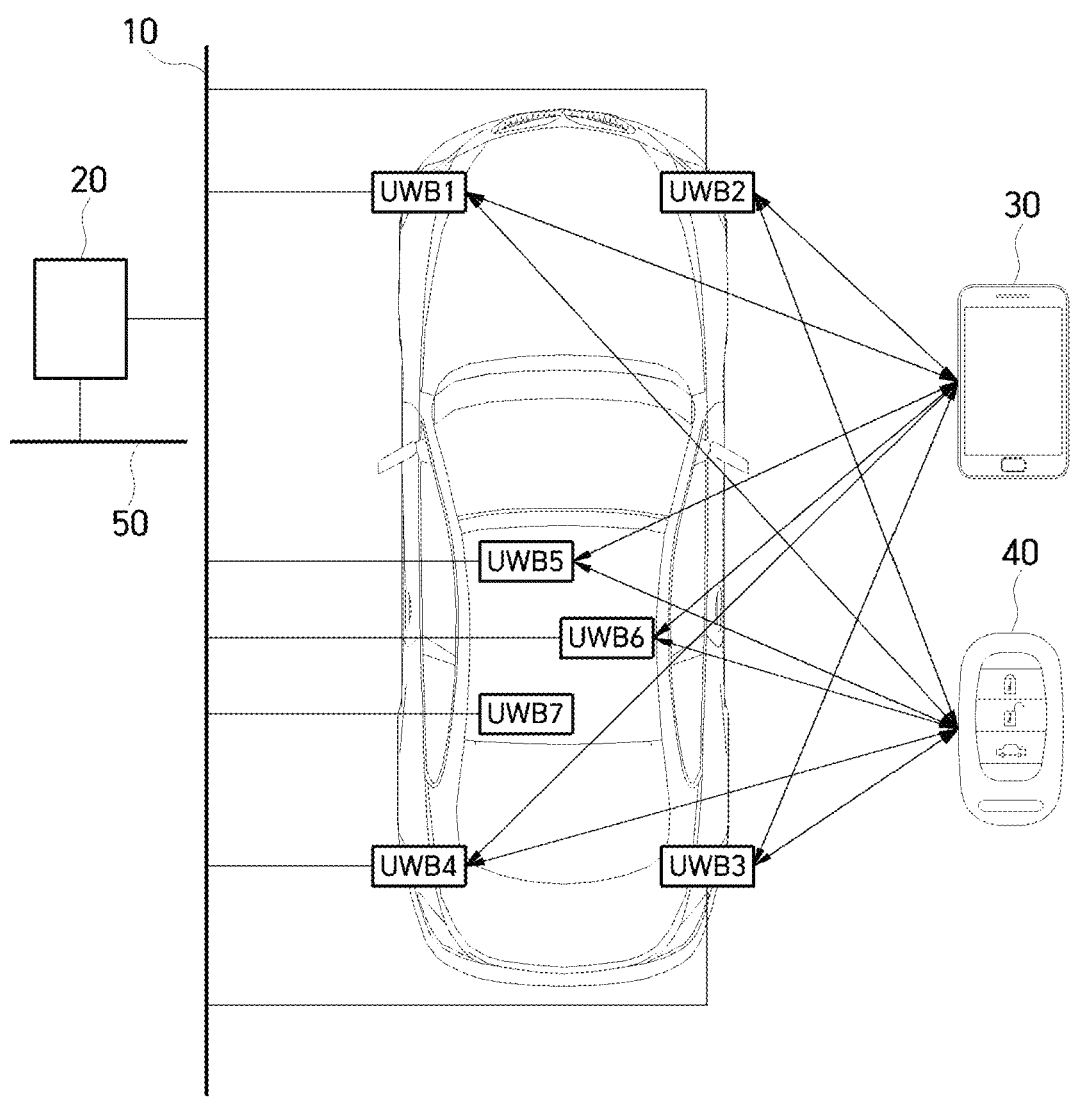
FIG. 1 shows an ultra-wideband (UWB) system applied to a specific vehicle.

FIG. 1 shows an ultra-wideband (UWB) system applied to a specific vehicle.

In the case of the vehicle UWB system shown herein, seven UWB modules UWB1 to UWB7 (anchors) are installed to communicate with a digital key 30 and a fob 40 (the number and installation locations of UWB modules may vary depending on the vehicle model, the vehicle size, etc.).

The installation positions of all the UWB modules UWB1 to UWB7 mounted on the same vehicle are determined and fixed at the development stage, but as mentioned above, due to errors or mistakes of assemblers or in assembly processes, the UWB modules are incorrectly assembled or misassembled greatly out of place. Such an installation error should be found at the end of line (EOL) in vehicle production. Meanwhile, when a UWB module is moved or out of place due to shock or other reasons while driving, a problem may occur in related functions (digital key positioning, fob authentication, etc.). This problem should be solved by a consumer recognizing the problem and visiting an auto repair shop or should be found at a regular vehicle inspection.

Figure 2:
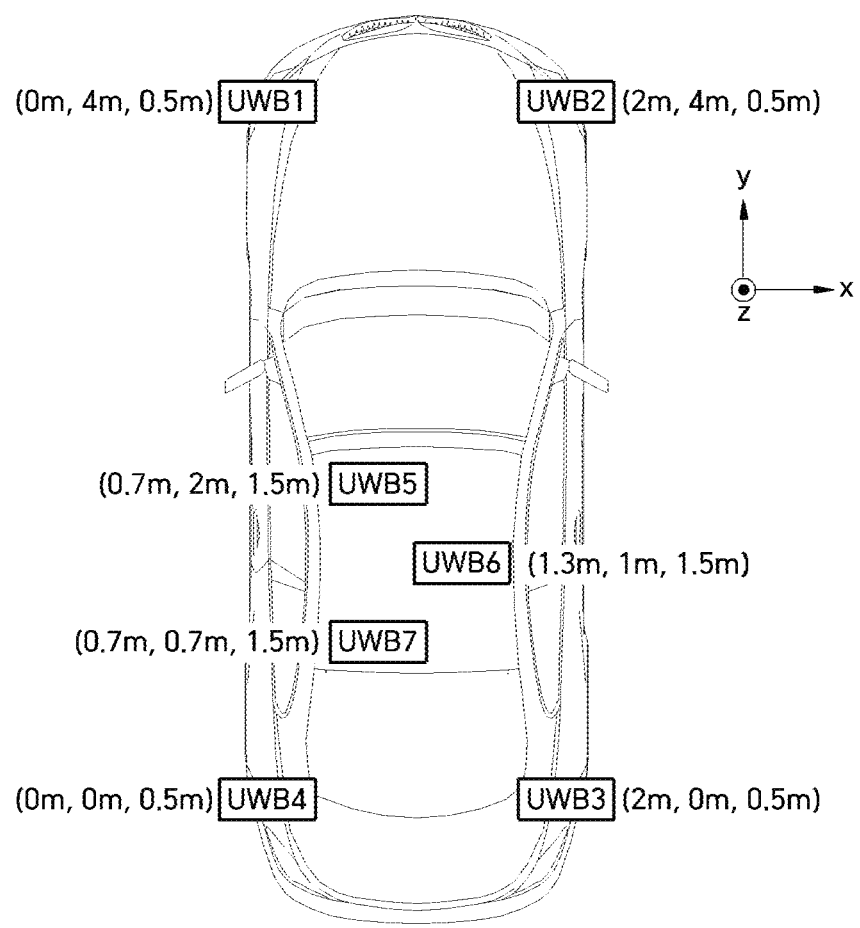
FIG. 2 illustrates the coordinates of each UWB module shown in FIG. 1.

FIG. 2 illustrates the coordinates (x, y, z) of the UWB modules UWB1 to UWB7 shown in FIG. 1. The position of UWB4 is set as a reference position (origin) on the plane. The x-axis represents a distance in a right vehicle width direction, the y-axis represents a distance in a vehicle forward direction, and the z-axis represents a distance in a vehicle roof direction. Accordingly, in the case of FIG. 2, UWB4 is at a position of 0 m on the x-axis, 0 m on the y-axis, and 0.5 m on the z-axis, and its coordinates are (0, 0, 0.5). Similarly, the coordinates of UWB1 are (0, 4, 0.5), the coordinates of UWB2 are (2, 4, 0.5), the coordinates of UWB3 are (2, 0, 0.5), the coordinates of UWB5 are (0.7, 2, 1.5), the coordinates of UWB6 are (1.3, 1, 1.5), and the coordinates of UWB7 are (0.7, 0.7, 1.5). In this way, the distance between UWB modules can be easily calculated mathematically with the fixed coordinates of each UWB module.

Figure 3:
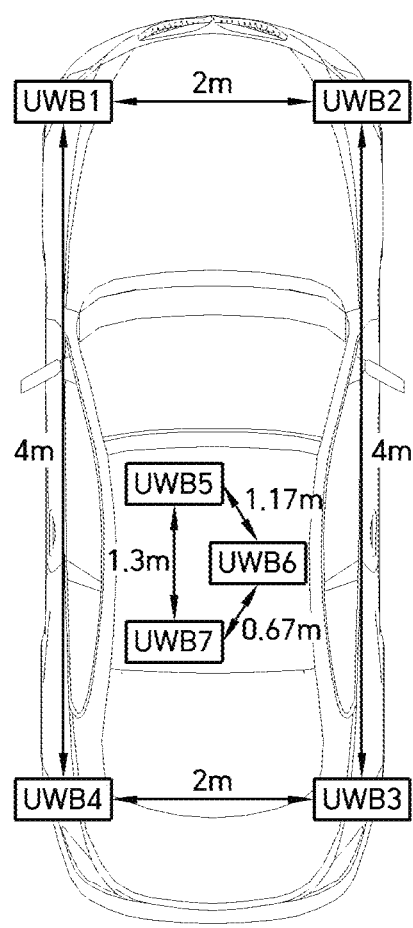
FIG. 3 shows distances between UWB modules calculated based on the coordinates of each UWB module in the case of FIG. 2.

FIG. 3 shows distances between UWB modules calculated based on the coordinates of each UWB module in the case of FIG. 2. However, the coordinates of the modules and the distances between the modules are already determined in the vehicle development stage. Therefore, after the UWB modules are installed in the vehicle, the distances between the modules can be measured by forcibly driving each module at the EOL or an auto repair shop. By comparing the measured distances between the modules to a predetermined distance, it is possible to detect the current positions of the UWB modules in the vehicle to estimate whether the positions are normal or abnormal. The forced driving of the UWB module may be performed through diagnosis communication between a vehicle diagnosis unit and a UWB module controller.

Referring back to FIG. 1, the UWB modules are connected to a local controller area network (CAN) network (a high-speed CAN or a CAN flexible data (FD)) 10 and are networked with a controller 20, such as the BDC, IBU, IAU, etc., of the vehicle in a wired manner. Since the UWB modules perform bidirectional communication with the digital key 30 and the fob 40, the UWB modules have both a transmission (Tx) function and a reception (Rx) function. Therefore, the distances between the modules can be measured using the Tx and Rx functions of the UWB modules.

Also, the controller 20 is connected to a Body CAN network 50. Therefore, diagnosis communication may be performed by accessing the controller 20 through the Body CAN network 50 using a diagnosis device. Using this diagnosis communication, it is possible to detect the positions of the UWB modules at the time of manufacturing (EOL) or inspection (auto repair shop) of the UWB modules, determine whether the positions are normal or abnormal, and display the determination result through the diagnosis device. In order to use the diagnosis communication through the diagnosis device, for example, "General Diagnostic Service—InputOutputControlByIdentifier" defined in the general diagnosis specification of the controller 20 may be used.

Figure 4:
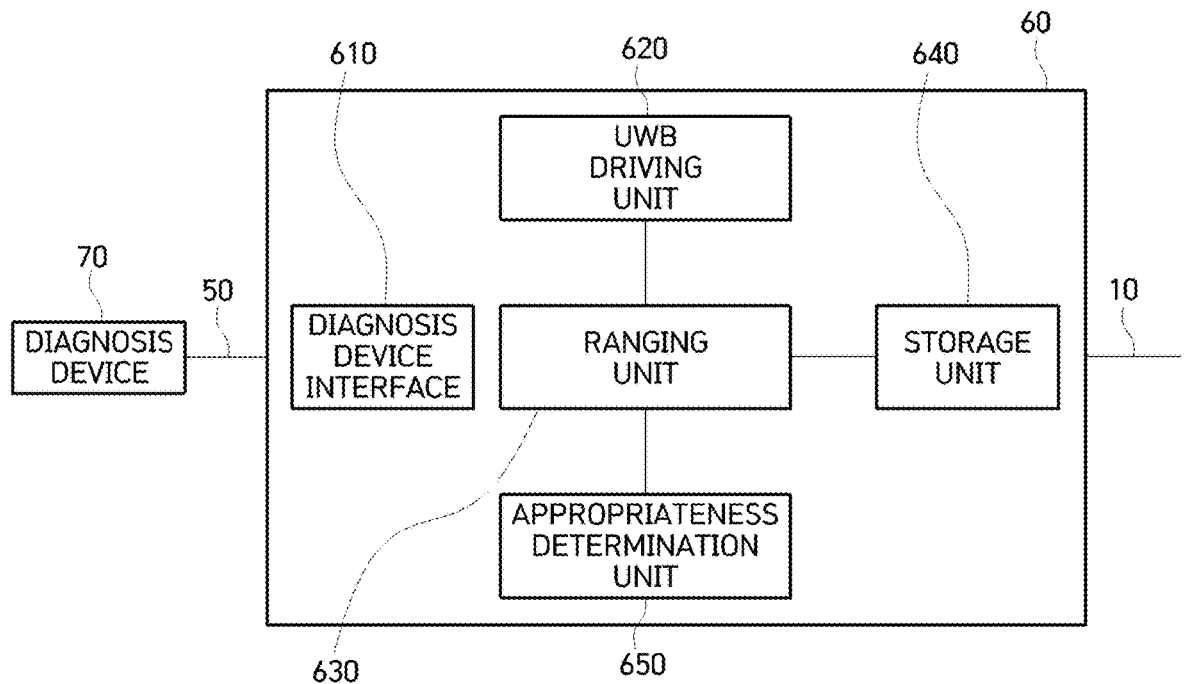
FIG. 4 is a block diagram of a UWB module position detection device according to an embodiment of the present invention.

FIG. 4 is a block diagram of a UWB module position detection device 60 according to an embodiment of the present invention. A UWB module position detection method according to the present invention can be easily derived from the device configured in FIG. 4.

The device 60 may be included in the controller 20, such as BDC, IBU, IAU, etc., connected to the Local CAN network 10 and the Body CAN network 50 shown in FIG. 1, but the present invention is not limited thereto. For example, the device 60 may be implemented as a separate and independently designed module that is dedicated to location detection for a UWB module, rather than the BDC, IBU, or IAU.

In FIG. 4, the UWB module position detection device 60 includes a diagnosis device interface 610 configured to receive a diagnosis command from a diagnosis device and output a diagnosis result to the diagnosis device when the diagnosis device 70 is connected through a Body CAN network 50; a UWB module driving unit 620 configured to forcibly drive multiple UWB modules (see FIG. 1) connected to a Local CAN network 10 when diagnosis (position detection) is started by a diagnosis command; a ranging unit 630 configured to perform ranging between the driven UWB modules; a storage unit 640 configured to store position information (e.g., the coordinates of each module) of the UWB modules; and an appropriateness determination unit 650 configured to compare a measured distance value obtained through the ranging of the ranging unit 630 to a reference distance value based on the position information of the UWB modules stored in the storage unit 640, determine that the measured distance value is appropriate when the two values (the measured distance value and the reference distance value) are substantially the same, and determine that the measured distance value is not appropriate when the two values are not substantially the same.

More specifically, in response to the diagnosis command from the diagnosis device 70, the UWB module driving unit 620 forcibly drives two of the multiple UWB modules, and the ranging unit 630 performs ranging on the two modules that are forcibly driven. (At this time, the UWB module is most affected by surrounding obstacles due to its frequency characteristics (6 to 8 GHz), and thus, accurate results can be obtained only when there are no obstacles (especially metal or people) between or around the two modules.)

For example, in the case of the vehicle UWB system shown in FIG. 1, the UWB module driving unit 620 forcibly drives UWB1 and UWB2, and then the ranging unit 630 performs ranging on UWB1 and UWB2. Then, the UWB module driving unit 620 forcibly drives UWB2 and UWB3, and then the ranging unit 630 performs ranging on UWB2 and UWB3. Next, by forcibly driving and performing ranging on the other UWB modules two by two, the UWB module driving unit 620 completes the ranging on all the UWB modules. In order to achieve the objects of the present invention, it is preferable that the ranging unit 630 should perform ranging at least twice on all of the multiple UWB modules.

As another example, the UWB module driving unit 620 may forcibly drive the multiple UWB modules as a whole, and the ranging unit 630 may perform ranging several times on two of the driven UWB modules. Even in this case, ranging should be performed at least twice on all of the multiple UWB modules.

As described above, the appropriateness determination unit 650 compares a measured distance value obtained through the ranging of the ranging unit 630 to a reference distance value based on the position information of the UWB modules stored in the storage unit 640, determines that the measured distance value is appropriate when the two values are substantially the same, and determines that the measured distance value is not appropriate when the two values are not substantially the same. Here, the two values being substantially the same denotes that an allowable deviation, although not completely the same, is included in the scope of the sameness. For example, in the case of the allowable deviation being set to ±0.5 m, when the reference distance value is 2 m and the measured distance value is 1.7 m, the values may be regarded as the same.

Figure 5:
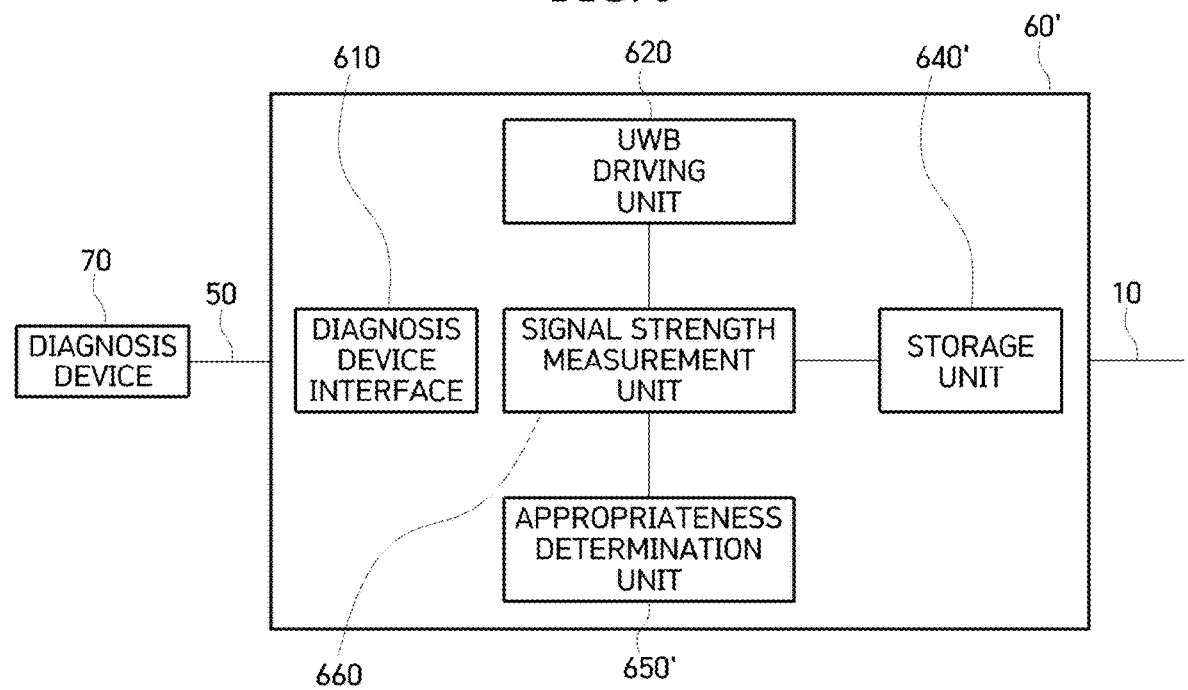
FIG. 5 is a block diagram of a UWB module position detection device according to a variation of the present invention.

FIG. 5 is a block diagram of a UWB module position detection device 60' according to a variation modified from the embodiment of FIG. 4. Here, a UWB module position detection method according to the present invention can be easily derived from the device configured in FIG. 5.

The embodiment of FIG. 5 are different from the embodiment of FIG. 4 in that a signal strength measurement unit 660 measures the signal strength of modules received from a specific module instead of the ranging unit 630 ranging between the modules and also in that the appropriateness determination unit 650' compares measured signal strength to reference signal strength stored in the storage unit 640 to determine that the signal strength is appropriate.

Specifically, the UWB module position detection device 60' according to the embodiment of FIG. 5 includes a diagnosis device interface 610 configured to receive a diagnosis command from a diagnosis device and output a diagnosis result to the diagnosis device when the diagnosis device 70 is connected through a Body CAN network 50; a UWB module driving unit 620 configured to forcibly drive multiple UWB modules connected to a Local CAN network 10 when diagnosis is started; a signal strength measurement unit 660 configured to measure the signal strength of the modules received by the driven UWB module; a storage unit 640' configured to store reference signal strength of each UWB module; and an appropriateness determination unit 650' configured to compare measured signal strength of the modules received by a specific UWB module obtained by the signal strength measurement unit 660 to reference signal strength stored in the storage unit 640', determine that the measured strength is appropriate when the two strength values are substantially the same, and determine that the measured strength is not appropriate when the two strength values are not substantially the same.

The table below is an example of the ranging and signal strength measurement policy performed by the ranging unit 630 or the signal strength measurement unit 660'.

|      | UWB1 | UWB2 | UWB3 | UWB4 | UWB5 | UWB6 | UWB7 |
|------|------|------|------|------|------|------|------|
| UWB1 |      | Distance: 2.00 ± 0.5 m Strength: −75 ± 8 dBm |      |      |      |      |      |
| UWB2 |      |      | Distance: 4.00 ± 0.5 m Strength: −85 ± 8 dBm |      |      |      |      |
| UWB3 |      |      |      | Distance: 2.00 ± 0.5 m Strength: −75 ± 8 dBm |      |      |      |
| UWB4 | Distance: 4.00 ± 0.5 m Strength: −85 ± 8 dBm |      |      |      |      |      |      |
| UWB5 |      |      |      |      |      | Distance: 1.17 ± 0.5 m Strength: −72 ± 8 dBm |      |
| UWB6 |      |      |      |      |      |      | Distance: 0.67 ± 0.5 m Strength: −70 ± 8 dBm |
| UWB7 |      |      |      |      | Distance: 1.30 ± 0.5 m Strength: −73 ± 8 dBm |      |      |

In this example measurement method, first, when the UWB module driving unit 620 forcibly drives UWB1 and UWB2, the ranging unit 630 performs ranging between UWB1 and UWB2, or the signal strength measurement unit 660 measures the signal strength of UWB2 received from UWB1. At this time, the reference distance value is 2.00±0.5 m, and the reference signal strength is −75±8 dBm. Subsequently, the UWB module driving unit 620 forcibly drives UWB2 and UWB3 to measure the distance between UWB2 and UWB3 or measure the signal strength of UWB3 received from UWB2. At this time, the reference distance value is 4.00±0.5 m, and the reference signal strength is −85±8 dBm. Subsequently, the UWB module driving unit 620 forcibly drives UWB3 and UWB4 to measure the distance between UWB3 and UWB4 or measure the signal strength of UWB4 received from UWB3. At this time, the reference distance value is 2.00±0.5 m, and the reference signal strength is −75±8 dBm. Subsequently, the UWB module driving unit 620 forcibly drives UWB4 and UWB1 to measure the distance between UWB4 and UWB1 or measure the signal strength of UWB1 received from UWB4. At this time, the reference distance value is 4.00±0.5 m, and the reference signal strength is −85±8 dBm. Subsequently, the UWB module driving unit 620 forcibly drives UWB5 and UWB6 to measure the distance between UWB5 and UWB6 or measure the signal strength of UWB6 received from UWB5. At this time, the reference distance value is 1.17±0.5 m, and the reference signal strength is −72±8 dBm. Subsequently, the UWB module driving unit 620 forcibly drives UWB6 and UWB7 to measure the distance between UWB6 and UWB7 or measure the signal strength of UWB7 received from UWB6. At this time, the reference distance value is 0.67±0.5 m, and the reference signal strength is −70±8 dBm. Finally, the UWB module driving unit 620 forcibly drives UWB7 and UWB5 to measure the distance between UWB7 and UWB5 or measure the signal strength of UWB5 received from UWB7. At this time, the reference distance value is 1.30±0.5 m, and the reference signal strength is −73±8 dBm. The forced driving of the UWB module and the measurement of distance or the measurement of signal strength may be performed step by step in the order described above but may also be performed at the same time.

When a measured distance value or measured signal strength is obtained by the ranging unit 630 or the signal strength measurement unit 660 as described above, the appropriateness determination unit 650 or 650' compares the obtained measured distance value or measured signal strength to a reference distance value or reference signal strength determined as shown in the table above and determines whether the distance between corresponding UWB modules and the signal strength of a corresponding UWB module is appropriate or not. The determination result is displayed on the diagnosis device 70 through the diagnosis device interface 610. Accordingly, an operator of the diagnosis device can find out which UWB module is abnormal from the displayed determination result.

However, it is also possible for a processor to automatically estimate which UWB module position is abnormal by performing a logical operation on the determination result. Therefore, in this case, the UWB module position detection device 60 or 60' according to the embodiment of FIG. 4 or 5 may include an abnormal-module estimation unit (not shown) configured to estimate a locally abnormal UWB module among the multiple UWB modules from the determination result of the appropriateness determination unit 650 or 650'.

For example, when the measured (ranged) distance value between UWB1 and UWB2 is determined to be appropriate as 2 m and the measured distance value between UWB2 and UWB3 is determined to be inappropriate as 5 m, an operator of the diagnosis device or the abnormal module estimation unit may estimate that the position of UWB3 is abnormal among UWB1, UWB2, and UWB3 because the abnormal module estimation unit determines that the distance between UWB2 and UWB3 is not appropriate under the condition that the distance between UWB1 and UWB2 is appropriate. (Of course, the case where the positions of UWB1, UWB2, and UWB3 are all abnormal due to complex causes cannot be excluded. In this case, it is necessary to disassemble a car or perform a more detailed analysis.)

Advantages that can be obtained by the present invention are as follows.

When a UWB module is installed out of place or moved during use, related service (a digital key or a fob) cannot be normally used. Even in this case, a UWB module that is invisible from the outside of the vehicle can be found by utilizing a unique function of the UWB through the present invention without going through a process of, for example, disassembling a vehicle. In particular, by using the diagnosis function of a related controller (BDC, IAU, IBU, etc.), position detection can be easily performed with the existing method and equipment (a vehicle diagnosis device), and thus it is possible to maximize the work efficiency of assembly line, auto repair shop workers, and relevant people in charge and also reduce the inspection cost.

The present invention has been described in detail with reference to the preferred embodiments, but those skilled in the art can understand that the present invention may be carried out in specific forms different from those described herein without changing the technical spirit or essential features of the present invention. Therefore, the above-described embodiments are to be regarded as illustrative rather than restrictive. Also, the scope of the present invention is defined not by the detailed description but by the following claims, and all changes or modifications within the claims and their equivalents will be construed as being included in the technical scope of the present invention.

What is claimed is:

1. A position detection device for a vehicle ultra-wideband (UWB) module, the position detection device comprising:
   a diagnosis device interface configured to receive a diagnosis command from a diagnosis device and output a diagnosis result to the diagnosis device;
   a UWB module driving unit configured to drive multiple UWB modules when diagnosis is started, and when the UWB modules are driven, two of the multiple UWB modules are driven, and when a signal strength is measured, signal strength of other modules received by one of the two driven modules is measured;
   a ranging unit configured to perform ranging between the driven UWB modules;
   a storage unit configured to store position information of the UWB modules; and
   an appropriateness determination unit configured to compare a measured distance value obtained through the ranging of the ranging unit to a reference distance value based on the position information stored in the storage unit, determine that the measured distance value is appropriate when the measured distance value is the same as the reference distance value, and determine that the measured distance value is not appropriate when the measured distance value is not the same as the reference distance value.

2. The position detection device of claim 1, wherein:
   the UWB module driving unit drives two of the multiple UWB modules, and
   the ranging unit performs ranging on the two driven modules.

3. The position detection device of claim 1, wherein:
   the UWB module driving unit drives the multiple UWB modules, and
   the ranging unit performs ranging on two of the driven multiple UWB modules.

4. The position detection device of claim 1, wherein the ranging unit performs ranging at least twice on each of the UWB modules driven by the UWB module driving unit.

5. The position detection device of claim 1, further comprising an abnormal module estimation unit configured to estimate an abnormal UWB module among the multiple UWB modules from a result of the determination by the appropriateness determination unit.

6. The position detection method of claim 1, wherein when the signal strength is measured, the signal strength measurement is performed at least twice on each of the driven UWB modules.

7. A position detection device for a vehicle ultra-wideband (UWB) module, the position detection device comprising:
   a diagnosis device interface configured to receive a diagnosis command from a diagnosis device and output a diagnosis result to the diagnosis device;
   a UWB module driving unit configured to drive multiple UWB modules when diagnosis is started;
   a signal strength measurement unit configured to measure signal strength of other modules received by the driven UWB module, and when the UWB modules are driven, two of the multiple UWB modules are driven, and when the signal strength is measured, signal strength of other modules received by one of the two driven modules is measured;
   a storage unit configured to store signal strength of each UWB module; and
   an appropriateness determination unit configured to compare measured signal strength obtained by the signal strength measurement unit to the stored signal strength in the storage unit, determine that the measured signal strength is appropriate when the measured signal strength and the stored signal strength are the same, and determine that the measured signal strength is not appropriate when the measured signal strength and the stored signal strength are not the same.

8. The position detection device of claim 7, wherein:
   the UWB module driving unit drives two of the multiple UWB modules, and
   the signal strength measurement unit measures signal strength of other modules received by one of the two driven modules.

9. The position detection device of claim 7, wherein:
   the UWB module driving unit drives the multiple UWB modules, and
   the signal strength measurement unit measures signal strength of other modules received from one of the driven multiple UWB modules.

10. The position detection device of claim 7, wherein the signal strength measurement unit performs signal strength measurement at least twice on each of the UWB modules driven by the UWB module driving unit.

11. The position detection device of claim 7, further comprising an abnormal module estimation unit configured to estimate an abnormal UWB module among the multiple UWB modules from a result of the determination by the appropriateness determination unit.

12. The position detection method of claim 7, wherein when the signal strength is measured, the signal strength measurement is performed at least twice on each of the driven UWB modules.

13. A position detection method for a vehicle ultra-wideband (UWB) module, the position detection method comprising:
   driving multiple UWB modules when diagnosis is started;
   performing at least one of ranging between the driven UWB modules and measurement of signal strength of other modules received from one of the driven multiple UWB modules, and when the UWB modules are driven, two of the multiple UWB modules are driven, and
   when the signal strength is measured, signal strength of other modules received by one of the two driven modules is measured;
   comparing a measured distance value obtained through the ranging to a reference distance value based on position information of the UWB modules when the ranging is performed; and
   determining that the measured distance value is appropriate when the measured distance value is the same as the reference distance value, and determining that the measured distance value is not appropriate when the measured distance value is not the same as the reference distance value or comparing measured signal strength to reference signal strength of each UWB module when the signal strength measurement is performed, determining that the measured signal strength is appropriate when the measured signal strength and the reference signal strength are the same, and determining that the measured signal strength is not appropriate when the measured signal strength and the reference signal strength are not the same.

14. The position detection method of claim 13, wherein:
   when the UWB modules are driven, two of the multiple UWB modules are driven, and
   the ranging is performed on the two driven modules.

15. The position detection method of claim 13, wherein:
   when the UWB modules are driven, the multiple UWB modules are driven, and
   the ranging is performed on two of the driven multiple UWB modules.

16. The position detection method of claim 13, wherein the ranging is performed at least twice on each of the driven UWB modules.

17. The position detection method of claim 13, wherein:
   when the UWB modules are driven, the multiple UWB modules are driven, and
   when the signal strength is measured, signal strength of other modules received from one of the driven multiple UWB modules is measured.

18. The position detection method of claim 13, wherein when the signal strength is measured, the signal strength measurement is performed at least twice on each of the driven UWB modules.

19. The position detection method of claim 13, further comprising estimating an abnormal UWB module among the multiple UWB modules from a result of the determination.

* * * * *